United States Patent [19]

Herslow

[11] Patent Number: 4,544,316
[45] Date of Patent: Oct. 1, 1985

[54] APPARATUS FOR AUTOMATICALLY AND CONTINUOUSLY WITHDRAWING COAL FROM A SHIP'S BUNKER

[75] Inventor: Ernst H. Herslow, Hässleholm, Sweden

[73] Assignee: Nils Weibull AB, Hassleholm, Sweden

[21] Appl. No.: 545,784

[22] Filed: Oct. 27, 1983

[51] Int. Cl.$^4$ ............................................. B65G 65/38
[52] U.S. Cl. ................... 414/144; 187/8.59; 198/518; 414/145; 414/320
[58] Field of Search ............... 414/144, 145, 305, 313, 414/316, 319, 320; 187/8.59; 212/205, 208, 215, 216; 198/518; 104/165, 235, 236

[56] References Cited

U.S. PATENT DOCUMENTS

| | | | |
|---|---|---|---|
| 2,863,397 | 12/1958 | Billings | 104/235 X |
| 3,116,586 | 1/1964 | Ingham | 212/216 X |
| 4,067,448 | 1/1978 | Bergeron | 187/8.59 X |
| 4,146,144 | 3/1979 | Johansson | 414/144 X |
| 4,170,433 | 10/1979 | Haahjem | 414/144 X |
| 4,242,026 | 12/1980 | Vaughan et al. | 414/305 X |
| 4,474,523 | 10/1984 | Ihle | 414/313 X |

FOREIGN PATENT DOCUMENTS 1510122 12/1967 France ..................... 414/313

*Primary Examiner*—Leslie J. Paperner
*Attorney, Agent, or Firm*—Barnes, Kisselle, Raisch, Choate, Whittemore & Hulbert

[57] ABSTRACT

An apparatus for automatically and continuously withdrawing coal from a ship's bunker by means of a screw conveyor suspended from a gantry beam transversely of the bunker in order to convey the coal towards one or both sides. The gantry beam travels on supporting beams extending in the longitudinal direction of the bunker and being movable in their turn on vertical beams by means of hydraulic devices mounted each at one end of the supporting beam and engaging the associated vertical beam. By being arranged in this manner, the screw conveyor covers the entire bunker area and can also be operated while the ship is under way at sea.

6 Claims, 4 Drawing Figures

APPARATUS FOR AUTOMATICALLY AND CONTINUOUSLY WITHDRAWING COAL FROM A SHIP'S BUNKER

The present invention relates to an apparatus for automatically and continuously withdrawing coal from a ship's bunker, also when the ship is under way at sea, said apparatus comprising a screw conveyor suspended from a gantry beam extending transversely of the bunker and adapted to convey the coal in the bunker towards at least one bunker side which has a discharge hopper.

Shovelling coal from a ship's bunker has always been hard and dirty work. Mechanical expedients have been developed, but do not always operate satisfactorily, especially under heavy weather conditions when the ship's motion hampers or prevents the proper functioning of these expedients.

The present invention aims at providing an apparatus by which the coal can be safely and reliably withdrawn from the bunker also under unfavourable conditions when the ship pitches and/or rolls.

To this end, the gantry beam of the screw conveyor is adapted to travel on supporting beams extending longitudinally of the bunker and vertically movable by means of hydraulic devices mounted at either beam end and engaging each with one vertical beam fixedly connected to the ship's hull.

The invention will be described in more detail below, reference being had to the accompanying drawings illustrating a preferred embodiment. In the drawings.

Figure 1:
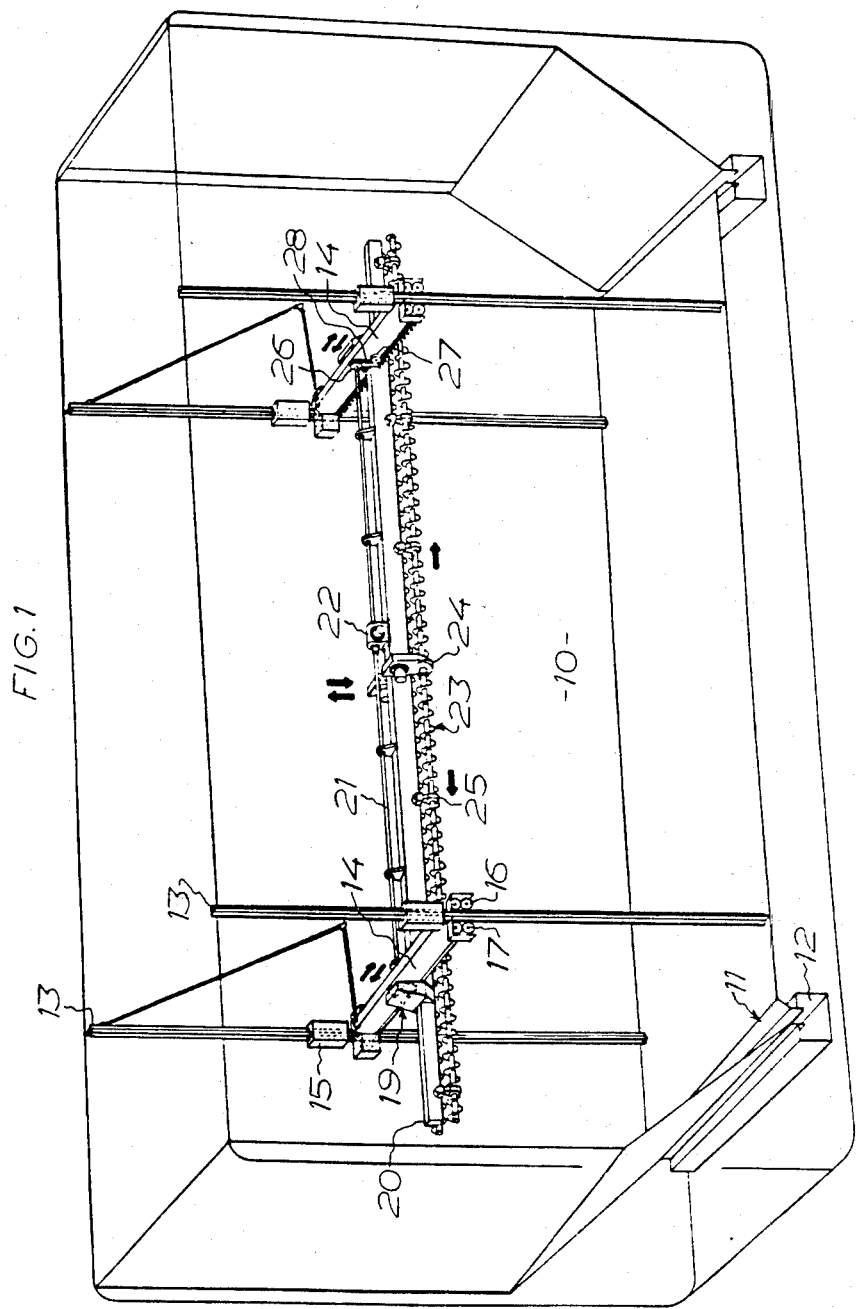
FIG. 1 is a perspective view of the apparatus according to the invention mounted in a ship's bunker.
Figure 2:
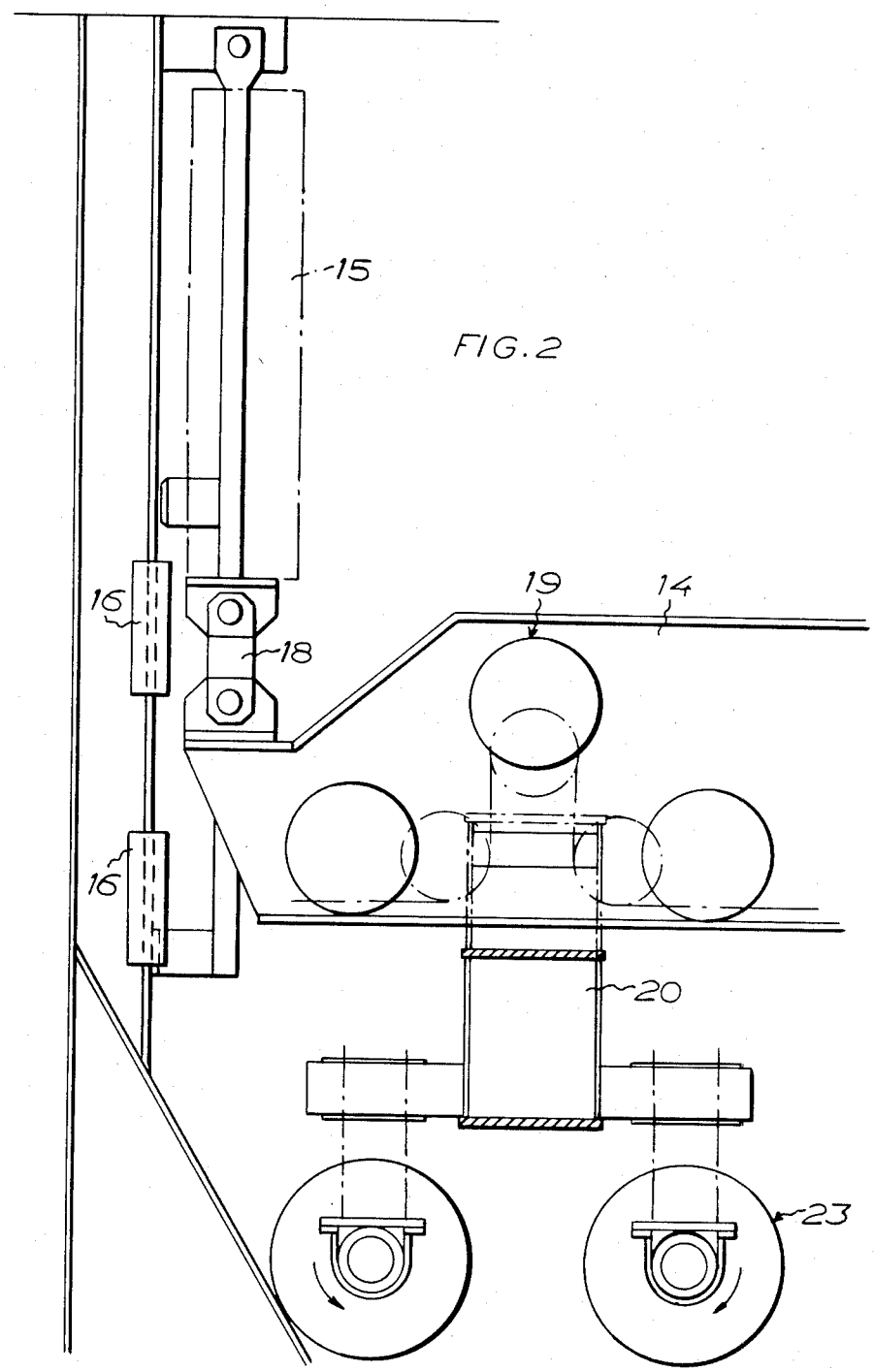
FIG. 2 is a lateral view of a supporting beam engaging with a vertical beam fixedly mounted in the bunker.
Figure 3:
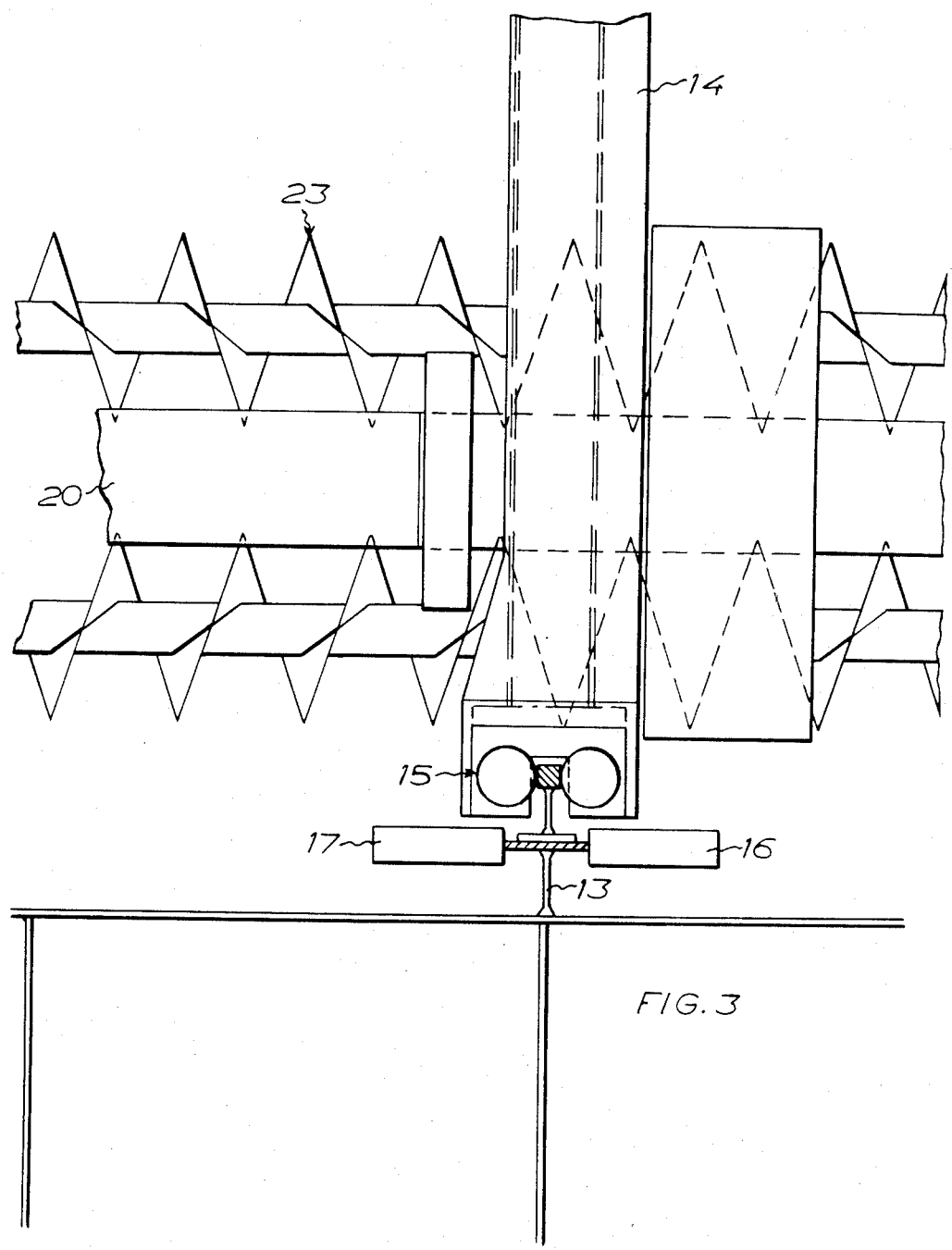
FIG. 3 is a top plan view of the apparatus according to FIG. 2.

FIG. 1 shows a ship's bunker 10 extending in the athwartship direction. Extending along either side of the bunker is a discharge hopper 11 opening into an underlying chute 12 in which a conveyor belt or the like (not shown) is travelling. Four vertical beams 13 having the cross-sectional shape shown in FIG. 3 extend over the entire height of the bunker and are located in pairs opposite one another and fixedly connected to the athwartship walls of the bunker at some distance from the discharge hoppers 11. Extending between each pair of vertical beams 13 is a supporting beam 14, the ends of which are connected each to one vertical beam 13 by means of a hydraulic climber 15 which is of conventional type and is connected to the beam via a link 18 (FIG. 2). On activation, the climbers 15 move up and down along their associated beams 13. The fluid supply to all of the four climbers 15 is, of course, synchronised. To safely control the movement along the beams 13, each beam end is provided with two sets of guide wheels 16, 17 of which the set 16 rolls on a flange on one side of the beam 13, while the other set 17 rolls on a corresponding flange on the opposite side of the beam 13, as will appear from FIGS. 1 and 4.

Figure 4:
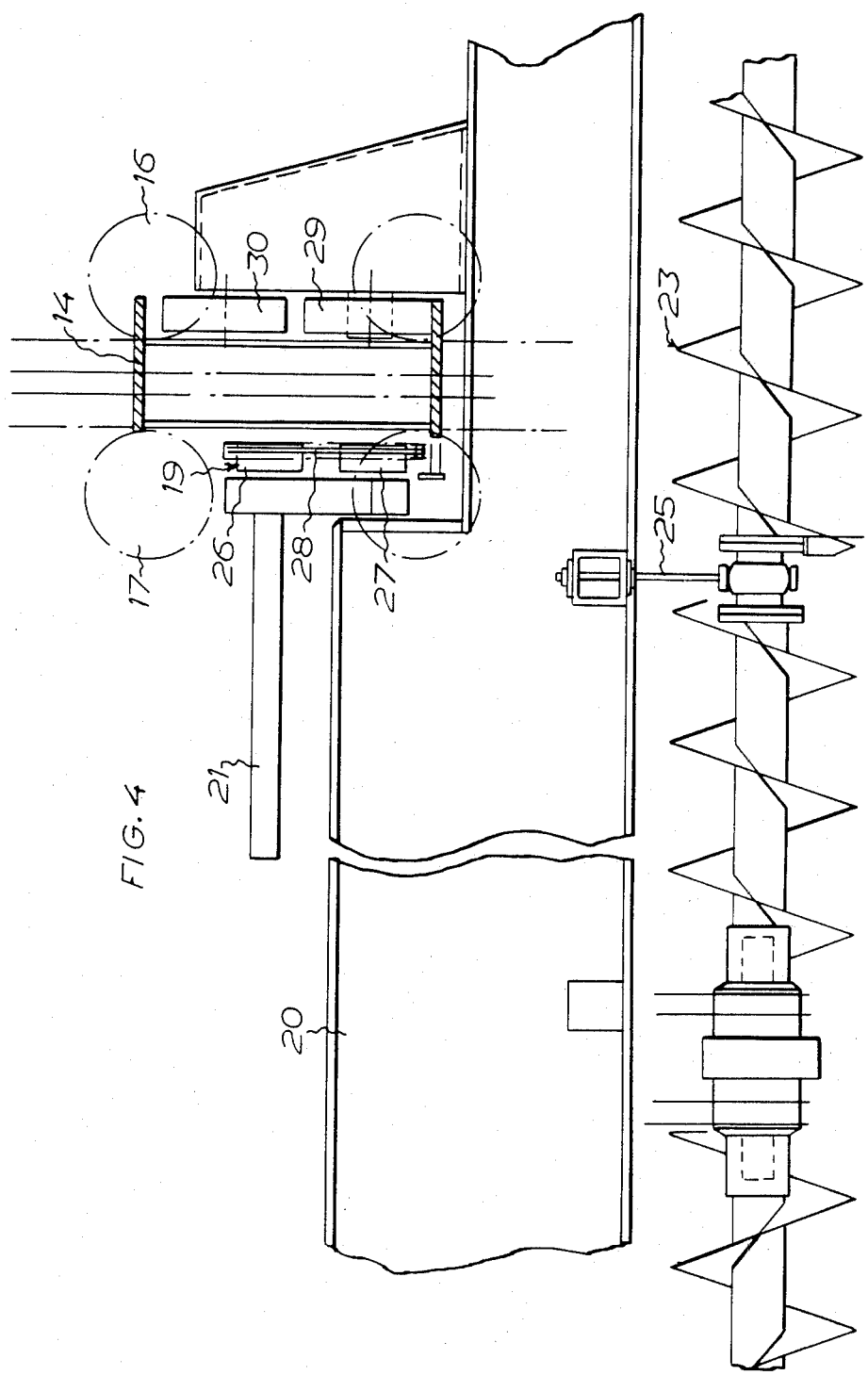
FIG. 4 illustrates the suspension of the screw conveyor in the supporting beam.

The supporting beams 14 are box beams having upper and lower flanges projecting horizontally from the web members (FIG. 4). A box beam 20 extending transversely of the supporting beams 13 and having a length corresponding approximately to the distance between the discharge hoppers, is suspended from the supporting beams 14 by means of travelling carriages 19 which, on the sides of the beams 14 facing away from one another, have a pair of wheels 29 rolling on the upper side of the lower flange of the beam 14, and a wheel 30 which is mounted above the wheels 29 and which, at a possible tilting of the beam 20 in the fore and aft direction, can roll on the lower side of the upper flange of the beam 14, as will appear from FIGS. 1 and 4. On the opposite side of the beam 14, the beam 20 has a similarly mounted set of wheels comprising two wheels 27 located horizontally opposite one another, and a wheel 26 which is mounted between and above the wheels 27, as is shown in FIG. 1. The opposite ends of a chain 28 are anchored each at one end of the beam 14 and extend below the lower wheels 27 and upwardly over the upper wheel 26. The wheel 26 is connected with one end of a drive shaft 21 extending along the upper side of the beam 20. The drive shaft has a drive motor 22 near the centre of the beam 20. If the drive motor 22 is actuated and the shaft 21 is rotated, the wheel 26 of each carriage 19 will roll on the chain 28 so that the beam 20 is moved along the beams 14 while being guided by the wheels 29, 30 on the opposite side of the beams 14.

On its lower side, the beam 20 has two parallel conveyor screws 23 which are of conventional type and extend over the entire length of the beam 20 in the same horizontal plane. The conveyor screws 23 are suspended from the beam 20 by a plurality of bearing means 25. Two motors are mounted on either side of the beam 20 in the centre thereof and are each adapted to rotate one conveyor screw in conventional manner. The pitch of the conveyor screws 23 is such that the coal is conveyed outwardly from the centre of the bunker, i.e. towards the discharge hoppers 11 in FIG. 1. Because of the explosion hazard, the motors are of the hydraulic type.

When the bunker shown in FIG. 1 is filled with coal, the apparatus according to the invention occupies a position at the top of the bunker, with the beam 20 as close as possible to one bunker wall in order not to interfere with the filling. The coal is withdrawn via the discharge hoppers and their associated components, and when the coal lying above the hoppers has been withdrawn, the beam 20 and the conveyor screws are set in motion back and forth along the beams 14, as shown by the double arrows, and the two conveyor screws convey the coal outwardly towards the hoppers, as also shown by arrows. The beam 20 and the conveyor screws 23 are then moved downwardly so that the screws are always in contact with the coal.

The apparatus according to the invention has been described with reference to the withdrawal of coal from a ship's bunker, but it will be appreciated that the apparatus can be used also for other purposes; for instance it can be mounted in a cargo hold for unloading bulk cargoes.

What I claim and desire to secure by Letters Patent is:

1. Apparatus for continuously withdrawing coal from a ship's bunker, also when the ship under way at sea, comprising in combination at least two pairs of vertical beams fixedly connected to the ship's hull, the beams of each pair being spaced apart longitudinally of the ship;

hydraulic means on each of said vertical beams, said hydraulic means being synchronized and adapted, upon supply of pressure medium, to climb up or down on said beams;

supporting beam means extending horizontally and longitudinally of the ship and supported by said hydraulic means of each pair of vertical beams mounted longitudinally of the ship, said supporting beam means being provided each with a runway;

a gantry beam extending horizontally and transversely of the ship and having wheeled carriages fixedly spaced apart longitudinally of said gantry beam, the wheels of said carriages rolling on the runways of said supporting beam means;

means for driving the wheels on each carriage for moving said gantry beam longitudinally along said supporting beam means;

conveyor screw means suspended from said gantry beam and extending transversely;

driving means for said conveyor screw means for so rotating the latter that it conveys coal at least towards one long side of the ship; and a discharge hopper along at least one of the long sides of the ship for taking up coal conveyed towards said side by said conveyor screw means.

2. Apparatus as claimed in claim 1, wherein said hydraulic means comprise hydraulic climbers from which said supporting beam means are suspended in a link, guide wheels being mounted on each beam end adapted to engage with opposite sides of an associated vertical beam.

3. Apparatus as claimed in claim 1, wherein said supporting beam means have a vertical web and upper and lower horizontal flanges protruding on opposite sides of said web, the wheels of said carriages being located in the space between the horizontal flanges of each beam and rolling on the upper runway surface of the lower flange, said driven wheel means drivingly engaging a flexible element extending along each supporting beam means.

4. Apparatus as claimed in claim 3, wherein said means for driving said wheel means comprise a motor connected to said wheel means of the carriages via drive shafts extending parallel to the upper side of said gantry beam.

5. Apparatus as claimed in claim 1, wherein said conveyor screw means comprises a pair of parallel screws mounted in the same horizontal plane and adapted to convey the coal from the center of the bunker towards the discharge hoppers at the bunker sides.

6. Apparatus as claimed in claim 1 including a discharge hopper along the other long side of the ship.

* * * * *